United States Patent [19]
Maile

[11] Patent Number: 5,749,448
[45] Date of Patent: May 12, 1998

[54] BRAKING SYSTEM INCORPORATING CONTINUOUSLY VARIABLE TRANSMISSION

[76] Inventor: Karen Maile, 1225 W. Gunn Rd., Rochester, Mich. 48308

[21] Appl. No.: 517,144

[22] Filed: Aug. 21, 1995

[51] Int. Cl.$^6$ .................................................. B60K 41/26
[52] U.S. Cl. .......................... 192/4 A; 477/47; 180/244
[58] Field of Search ........................... 192/4 A, 4 B; 477/40, 47, 184, 187; 180/165, 244, 251, 366; 188/266, 291

[56] References Cited

U.S. PATENT DOCUMENTS

| | | | |
|---|---|---|---|
| 3,344,879 | 10/1967 | Glomb et al. | 192/4 B X |
| 3,424,261 | 1/1969 | Sheldon | 180/366 X |
| 3,641,843 | 2/1972 | Lemens | 180/165 X |
| 3,823,792 | 7/1974 | Dinkloh et al. | 180/244 X |
| 3,861,485 | 1/1975 | Busch | 192/4 A X |
| 4,393,964 | 7/1983 | Kemper | 477/40 X |

OTHER PUBLICATIONS

Herbert Demel and Herbert Hemming, "ABS and ASR for Passenger Cars —Goals and Limits", SAE Technical Paper Series, 1989, pp. 1–7.

Thomas D. Gillespie, "Fundamentals of Vehicle Dynamics", 1992, Chapter 3, pp. 55–56.

Shinji Matsumoto et alia, "Improvement of Vehicle Dynamics Through Braking Force Distribution Control", ABS/Traction Control and Advanced Brake Systems, Feb. 1992, pp. 83–91.

*Primary Examiner*—Richard M. Lorence
*Attorney, Agent, or Firm*—Harness, Dickey & Pierce, P.L.C.

[57] ABSTRACT

A braking system for a wheeled vehicle includes a continuously variable transmission that replaces conventional braking systems. In one embodiment, a single continuously variable transmission is used from which power is distributed to either the front wheels, the back wheels, or to all of the wheels. In an alternate embodiment, at least two continuously variable transmission controls are fitted, each being connected to a wheel. The braking system may be powered by either an electric motor or an internal combustion engine.

20 Claims, 4 Drawing Sheets

BRAKING SYSTEM INCORPORATING CONTINUOUSLY VARIABLE TRANSMISSION

BACKGROUND OF THE INVENTION

1. Technical Field

The present invention relates to braking systems for wheeled vehicles. More particularly, the present invention relates to a braking system incorporating a continuously variable transmission that operates as a brake for a wheeled vehicle.

2. Description of the Relevant Art

Braking systems for wheeled vehicles vary in design and have steadily improved. Designs include in-transmission band systems such as that employed in the Ford Model "T", mechanically-operated drum systems, and pneumatically operated drum and disc systems.

More recent improvements include anti-lock braking systems ("ABSs"). While presenting a significant step in the improvement of braking systems, ABSs have their own characteristic problems. One of the drawbacks of ABS is that the pulsing of approximately 15 Hz cannot respond suddenly to rapid changes in the coefficient of friction between the tire and the road surface. ABSs either apply brakes completely or not at all.

Beyond the application of systems specifically designed for braking to slow or stop a wheeled vehicle in motion, it is known to use a conventional manual transmission to "downshift" and slow the vehicle. Such a technique is frequently used by race car drivers. Downshifting using a standard transmission causes sudden deceleration and is accompanied by a high pitched engine noise. Normally when one brakes, the kinetic energy of the moving vehicle is dissipated in the form of heat at the brake pads. When downshifting, the kinetic energy is mostly converted to rotational kinetic energy of the flywheel, thus causing the familiar high-pitched sound. However, braking by downshifting of the conventional manual transmission has its own set of problems, not the least of which is wear on the transmission gears and the clutch plate.

Accordingly, efficient braking systems for wheeled vehicles remain wanting.

SUMMARY OF THE INVENTION

It is therefore an object of the present invention to overcome the disadvantages of known braking systems for wheeled vehicles by providing a braking system that incorporates a continuously variable transmission.

It is a further object of the present invention to provide such a system that is believed to improve emissions performance, increase fuel mileage, and provide smooth acceleration.

Yet a further object of the present invention is to provide such a braking system which responds quickly to shifts in the friction coefficient, thereby keeping the brake force closer to the theoretical maximum than known anti-lock braking systems.

It is a further object of the present invention to provide such a braking system which uses a continuously variable transmission (sometimes referred to hereafter as "CVT" or "CVTs") to perform energy conversion in a continuous controlled way.

An additional object of the present invention is to provide such a braking system that makes use of the smooth gear ratio changing abilities of the continuously variable transmission.

The present invention comprises a braking system that incorporates a continuously variable transmission that replaces conventional hydraulic and anti-lock braking systems. One or more continuously variable transmissions may be employed. For example, if a single transmission is used, power therefrom may be distributed to the front wheels, or the rear wheels, or to all of the wheels. Alternately, a continuously variable transmission may be fitted to each wheel. This latter embodiment provides front-rear and left-right distribution control.

The use of continuously variable transmissions for braking has several variations and advantages. For instance, the use of multiple CVTs controlling each wheel independently removes the need for a differential entirely. Some CVTs have the capability of performing energy recovery thereby enabling vehicles to capture the energy normally dissipated during braking. The ability of the CVT to smoothly convert the energy of a flywheel into usable energy gives it an edge over current energy recovery techniques such as those found on prototype busses in Europe. CVTs provide smooth, even acceleration and revive older technologies such as Stirling cycle engines by providing a way to overcome the sluggish acceleration of this high efficiency engine. Even electric vehicles benefit from a high efficiency CVT. Instead of varying the electric motor(s) to achieve various gear ratios, the motor(s) can run at their optimal efficiency and rely on the CVT(s) to achieve the gear ratios. Even gasoline engines are run at optimal efficiency by running at a gear ratio that maximizes the horsepower once the vehicle is up to speed.

Other objects and advantages of the present invention will be made apparent as the designation progresses.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENTS

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 1:
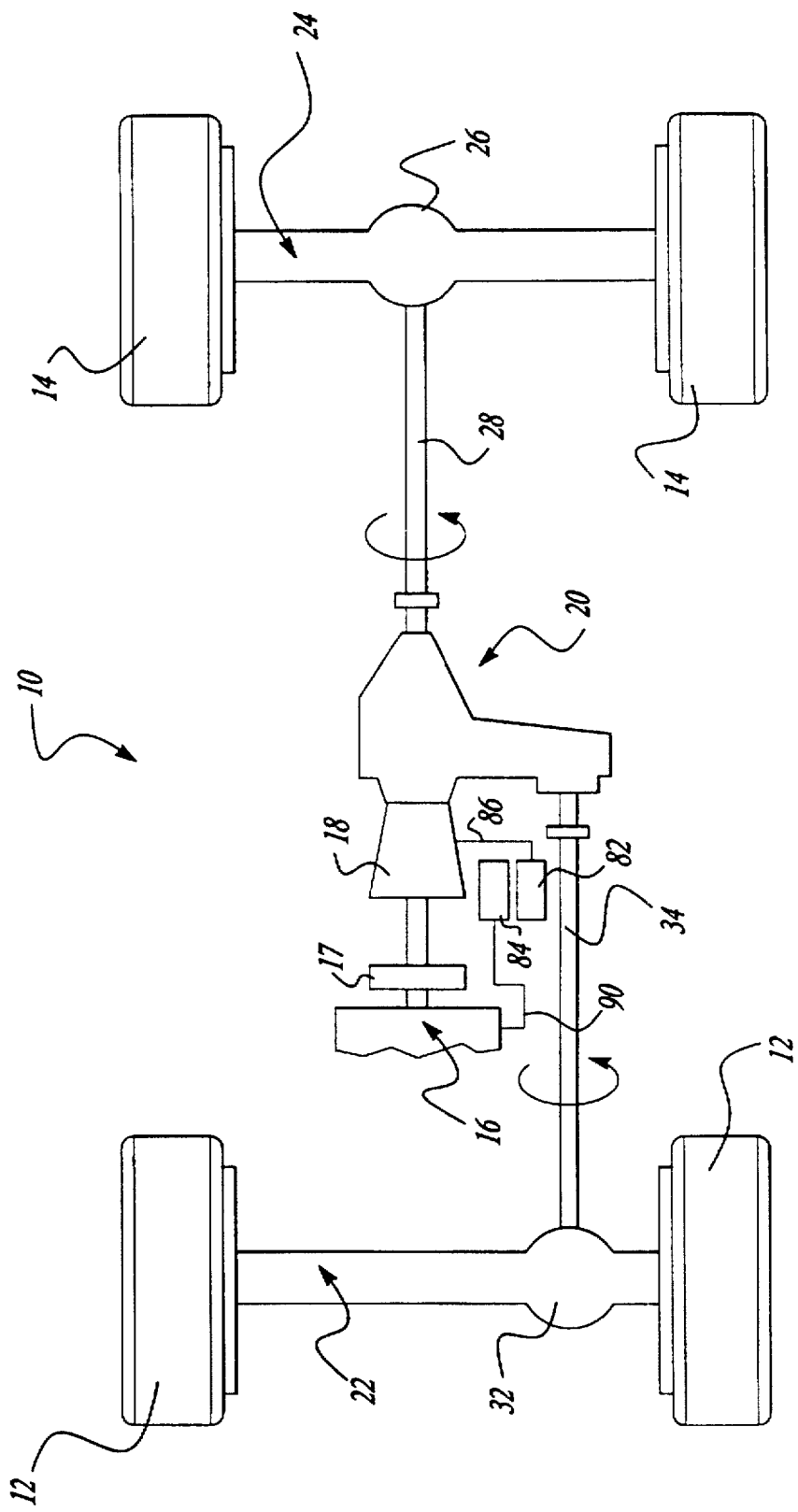
FIG. 1 is a schematic representation of an exemplary vehicle having a single continuously variable transmission incorporated therein for distribution of power to pairs of front and rear drive wheels.

Referring to FIG. 1 of the drawings, a schematic representation of a drivetrain for a four-wheel drive vehicle incorporating the novel principles of the present invention is generally shown as 10. The motor vehicle drivetrain 10 has a pair of front wheels 12 and a pair of rear wheels 14 both drivable from a source of power, such as a power plant 16 (either electric or internal combustion), through a flywheel 17 and a continuously variable transmission 18. In the particular embodiment shown, the drivetrain is a four-wheel drive system which incorporates a transfer case 20 operable to receive drive torque from the power plant 16, the flywheel 17, and the transmission 18. However, it is to be understood that the specific orientation of the drivetrain 10 is merely exemplary in nature and that the drivetrain 10 could be either a front wheel drive or a rear wheel drive arrangement.

The front wheels 12 and the rear wheels 14 are shown connected at opposite ends of the front and the rear axle assemblies 22 and 24, respectively. As is known, a rear differential 26 is interconnected between the rear axle assembly 24 and one end of a rear drive shaft 28, the opposite end of which is interconnected to the transfer case 20. The front axle assembly 22 includes a front differential 32 that is coupled to one end of a front drive shaft 34, the opposite end of which is connected to the transfer case 20. Since the CVT 18 is expected to be used to increase mileage, the flywheel 17 is larger than is a normal flywheel. (Current flywheel technology exists that can take a medium sized car from 0 to 60 mph without a heavy flywheel. This is accomplished by designing flywheels that have higher rpm capabilities. [Note that the rotational kinetic energy of a flywheel is $\frac{1}{2}I\chi^2$.]) Also, since most of the horsepower of an engine is used for acceleration rather than cruising, vehicles with CVTs and energy recovering flywheels are able to utilize significantly smaller engines while maintaining similar performance. For example, a small vehicle could use energy recovered from braking and pump even more energy into the flywheel while at a red light and beat a high performance vehicle off the mark. Accordingly, vehicles employing CVTs will be significantly lighter than current vehicles in the same performance range. The CVT-controlled braking scheme also has the advantage that nearly everything needed will already be in place obviating the need for an expensive hydraulic system to perform anti-lock braking. (It is also notable that the CVT is able to handle traction control when accelerating.)

Figure 2:
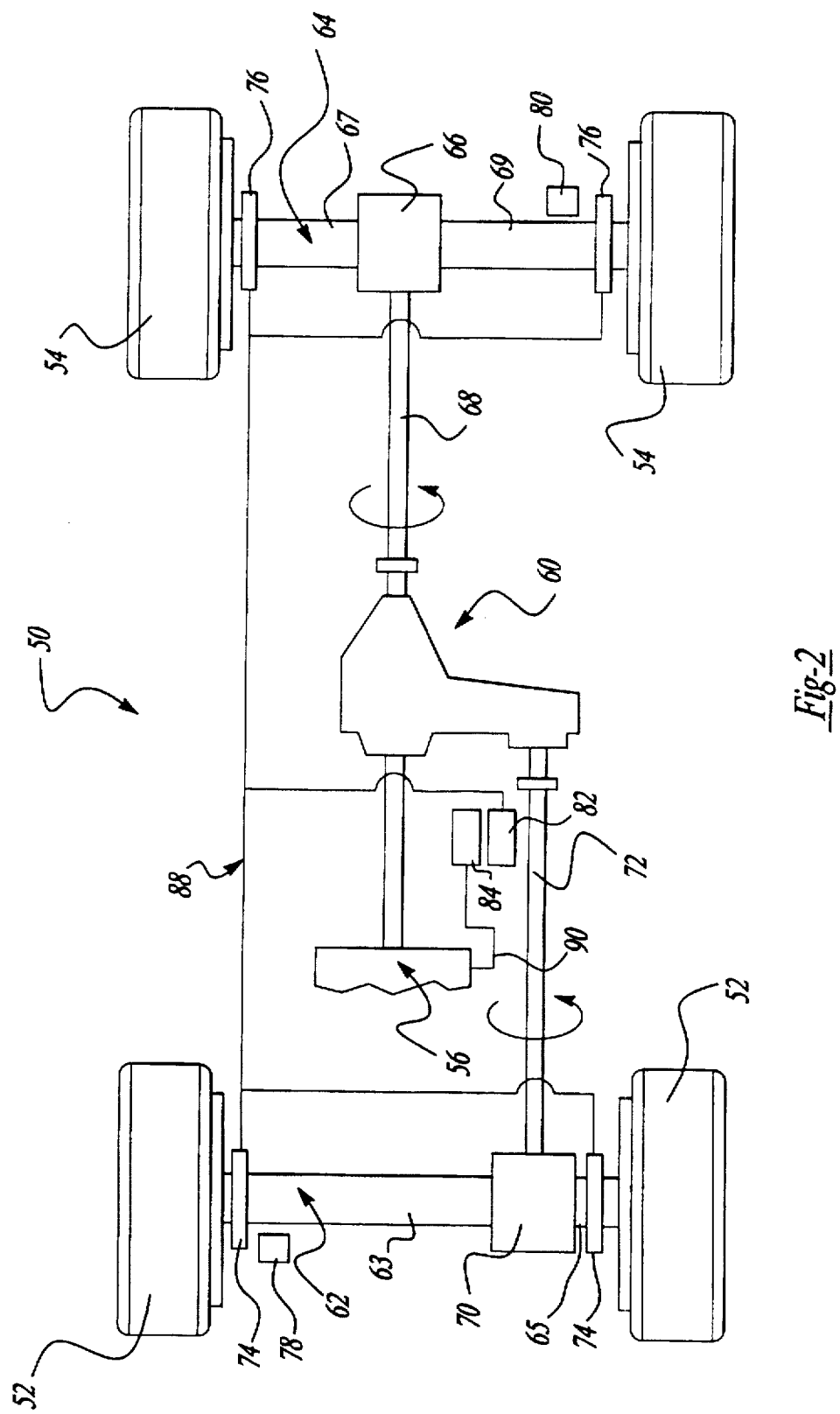
FIG. 2 is a schematic representation of an exemplary vehicle similar to the illustration of FIG. 1 but having a continuously variable transmission fitted to each wheel.

FIG. 2 of the drawings discloses a schematic representation of an alternative embodiment of the present invention. A drivetrain for a four-wheel drive vehicle, generally illustrated as 50, includes a pair of front wheels 52 and a pair of rear wheels 54, both pairs of which are drivable from a source of power, such as a power plant 56 (again either electric or internal combustion). As with the embodiment of FIG. 1, the drivetrain 50 of the particular embodiment shown incorporates a transfer case 60 operable to receive torque from the power plant 56. However, it is to be understood that the specific orientation of the drivetrain 50 is merely exemplary and that the drivetrain 50 could be either a front wheel or a rear wheel drive arrangement.

The front wheels 52 and the rear wheels 54 are connected at opposite ends of the front and rear axle assemblies 62 and 64, respectively. The front axle assembly 62 includes a first half 63 and a second half 65. The rear axle assembly 64 includes a first half 67 and a second half 69. A rear power transfer case 66 comprising, preferably, simple bevel gears (not shown) is interconnected between the rear axle assembly 64 and one end of a rear drive shaft 68, the opposite end of which is interconnected to the transfer case 60. (According to this configuration, the need for axles driven by differentials is eliminated.) The front axle assembly 62 includes a front power transfer case 70 also preferably comprising simple bevel gears (again not shown) that is coupled to one end of a front drive shaft 72, the opposite end of which is connected to the transfer case 60.

The embodiment of FIG. 2 incorporates a pair of separate CVT controls 74 in conjunction with each of the front wheels 52 and a pair of separate CVT controls 76 in conjunction with each of the rear wheels 54. The CVT controls 74 and 76 are small, high efficiency units. Incorporation of the controls 74 and 76 eliminates the need for a differential as noted above and also allows highly advanced left/right, front/back braking control techniques to be implemented. If, in addition, a CVT is capable of moving continuously into reverse then electric vehicles can utilize this capability by charging batteries when going downhill by using the CVTs to make the electric motors function as generators.

Although it has only a small affect on braking characteristics, another paradigm change is the possibility of CVTs reviving Stirling engine technology as briefly mentioned above. One of the major problems with the Stirling engine is its slow acceleration characteristics. A CVT that allows efficient application of energy stored in a flywheel would allow the use of a Stirling engine without sacrificing acceleration. (The desirability of the Stirling engine is that the Stirling cycle is the closest approximation to the Carnot Cycle that is reasonably available. The Carnot Cycle is capable of higher efficiencies than any other thermodynamic cycle. The external combustion Stirling engine also provides the possibility of using cleaner forms of fuel since it only requires heat to operate.)

Accordingly, it is possible to consider independent wheel CVTs and advanced braking control schemes such as front-rear and left-right distribution control. A subset of the problem will be examined to determine basic feasibility and discuss the possibility of extending the technique to more advanced control schemes. Note that more advanced control schemes using CVTs are not limited to using wheel slip as one of the control variables. Furthermore the side force instabilities and effects of turning while braking will not be addressed. The definition of wheel slip is generally taken as being:

$$\text{Slip} = \frac{V - \omega r}{V}$$

It will also be assumed that some mechanism is available for quickly measuring vehicle velocity. It is further assumed that wheel tread velocity can be quickly measured using, for example, multiple magnetic pickups on the axles such as a front axle magnetic pickup 78 and a rear axle magnetic pickup 80. For present purposes, it should be assumed that the maximum slip that can occur over various road conditions and vehicle velocities, $\mu p$, is a constant (such as 0.187) and has been empirically determined for a given vehicle.

The embodiments of both FIGS. 1 and 2 employ two pedals to operate the vehicle, a left pedal 82 and a right pedal 84. The left pedal 82 looks quite similar to a brake pedal. In the drivetrain 10 of FIG. 1, the left pedal 82 is connected to the CVT 18 by a connector 86. In the drivetrain 50 of FIG. 2, the left pedal 82 is connected to the pairs of CVTs 74 and 76 by a connection circuit, generally illustrated as 88. The right pedal 84 is a standard accelerator pedal and is connected to the power source. In the drivetrains 10 and 50 of FIGS. 1 and 2 respectively, the right pedal 84 is connected to the power plants 16 and 56 respectively by a connector 90.

When the left pedal 82 is depressed, the vehicle is slowed at a rate that is a percentage of the maximum percent slip.

For example, if the driver presses the left pedal 82 half way, the vehicle slows at half the maximum slip rate. (Note that engaging the left pedal 82 should also cut power to the engine.) Rather than have the CVT cause a jump in the gear ratio similar to current transmissions, it changes rapidly yet continuously. Since it is desirable to attain a specified wheel slip value, the control variable can be taken to be the measured wheel slip.

Figure 3:
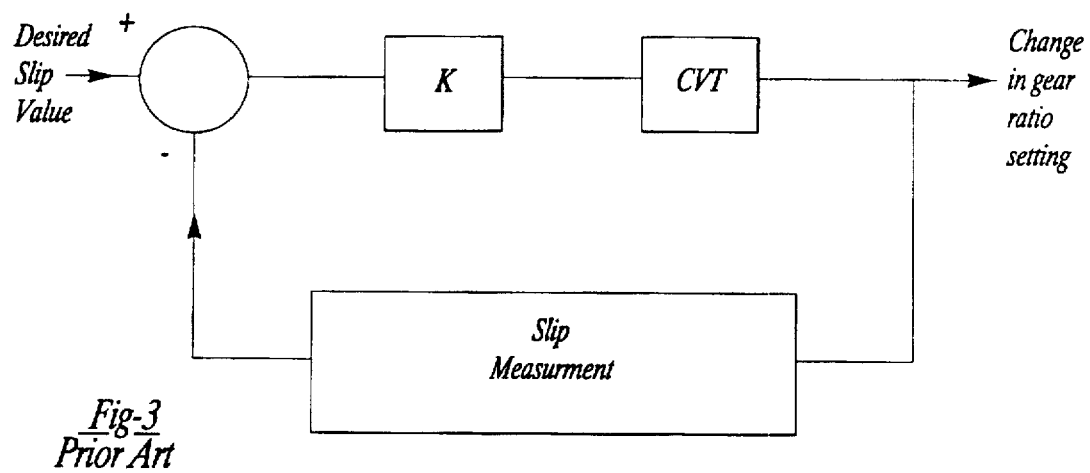
FIG. 3 is a block diagram illustrating wheel slip feedback control.

In a standard feedback control circuit such as that illustrated in FIG. 3, the gain, k, determines how rapidly that continuous change occurs. The simplest implementation of a control scheme is obtained when the gain is a constant that is determined empirically for a given vehicle. The gain should be such that it does not take a long time for the target wheel slip to be reached nor happen so fast that the vehicle makes a sudden jerk. Most physical systems have built in inertia effects thus a relatively high gain will not cause much of a problem. Given this situation it should be possible to start the control immediately after the left pedal 82 is depressed. The value of the wheel slip percentage is calculated from the vehicle velocity and axle rpm (assuming a constant wheel radius). The difference between the wheel slip percentage and the target value is used as the feedback control.

Figure 4:
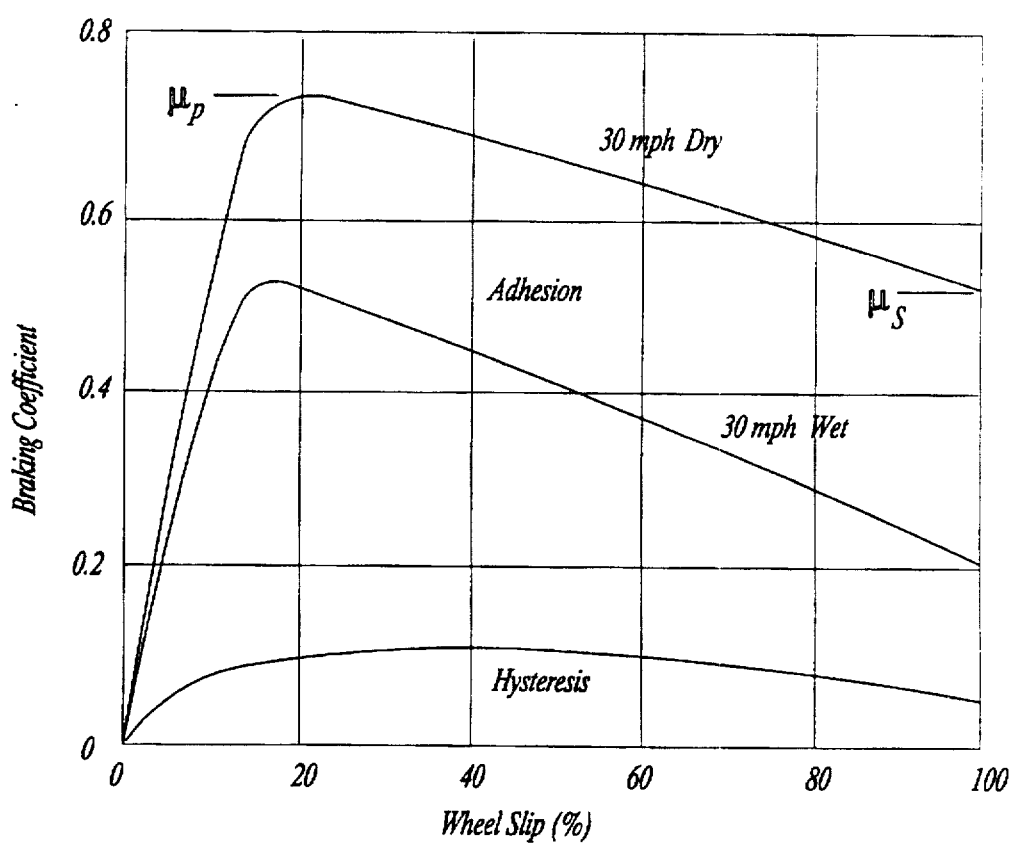
FIG. 4 is a graph demonstrating variance for different road conditions.

Additional alternate embodiments of the present invention exist. An obvious alternate embodiment is directed to a higher order control scheme. The problem with the first order control scheme is that its inability to track rapid transients causes some undesirable overshoot. Another possible alternative embodiment is directed to observation of the peak value µp which is dependent on vehicle speed and road conditions, as illustrated in FIG. 4 wherein wheel slip (in percentage) is taken along the X-axis and braking coefficient is taken along the Y-axis. (As disclosed in "Fundamentals of Vehicle Dynamics" by Thomas D. Gillespie, *Society of Automotive Engineers. Inc.*, 1994, pps. 55–56.) Instead of determining a standard maximum wheel slip percentage for a vehicle and using it as the target value, it would be preferred to increase the slip percentage while watching for the static/dynamic friction threshold. This would provide greater braking capacity under adverse conditions.

Figure 5:
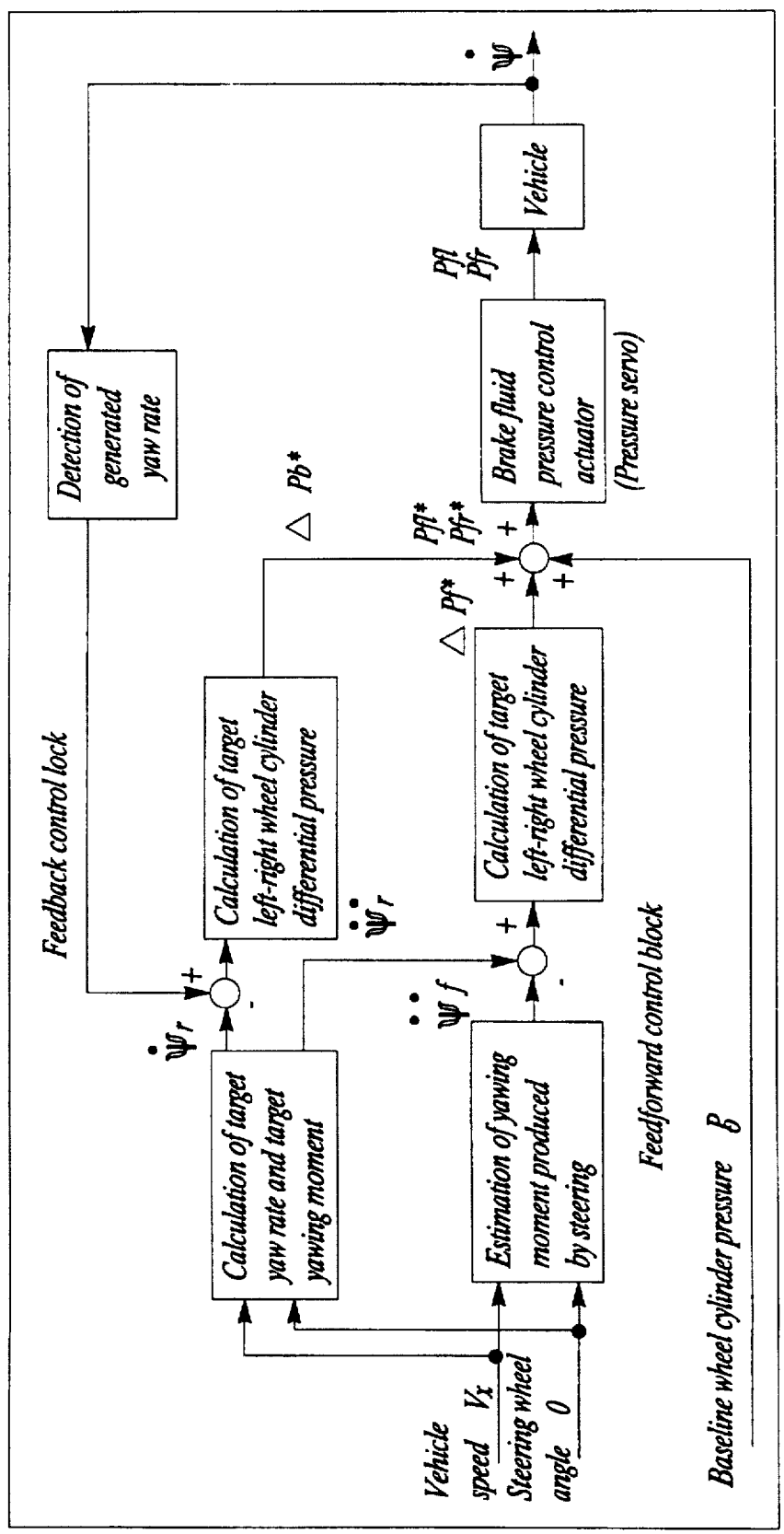
FIG. 5 is a feedback control block incorporating a steering control mechanism.

An additional alternate embodiment is directed to exploiting the capability of CVT controlled braking by implementing other advanced braking strategies. The diagram shown in FIG. 5 can be modified by using independent CVT wheel control to sense and control slip on each individual wheel. (As disclosed in "Improvement of Vehicle Dynamics Through Braking Force Distribution Control" by Shinji Matsumoto et al., *ABS/Traction Control and Advanced Brake Systems*, SAE Paper No. 920645, Feb. 1992.)

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A braking system for use in a wheeled vehicle, the braking system comprising:

a power source having an output end;

a drive shaft having a first end and a second end, said first end of said drive shaft being connected to said output end of said power source;

a power transfer case, said second end of said drive shaft being connected to said transfer case;

a first axle having a wheel end and a transfer case end, said transfer case end being connected to said power transfer case;

a second axle having a wheel end and a transfer case end, said transfer case end being connected to said power transfer case, said first and second axles being substantially co-axial;

a first continuously variable transmission;

a first brakable wheel connected to said wheel end of said first axle, said first continuously variable transmission being operatively positioned between said first brakable wheel and said power transfer case;

a second continuously variable transmission; and a second brakable wheel connected to said wheel end of said second axle, said second continuously variable transmission being operatively positioned between said second brakable wheel and said power transfer case, whereby selective operation of said continuously variable transmission effects braking of the wheeled vehicle.

2. The braking system of claim 1, wherein said power source is an internal combustion engine.

3. The braking system of claim 1, wherein said power source is an electric motor.

4. The braking system of claim 1, further including means for operating said continuously variable transmission.

5. The braking system of claim 4, wherein said means for operating said continuously variable transmission is a foot-operated pedal.

6. The braking system of claim 1, further including a magnetic pickup associated with said drive shaft for measuring velocity of said brakable wheel.

7. The braking system of claim 1, further including a second output end on said power source and a second drive shaft having a first end and a second end, said first end of said second drive shaft being connected to said second end of said output end of said power source, said braking system further including a second power transfer case, said second end of said second drive shaft being connected to said second power case.

8. The braking system of claim 7, further including a third axle having a wheel end and a transfer case end, said second transfer case end being connected to said second power transfer case.

9. The braking system of claim 8, further including a fourth axle having a wheel end and a transfer case end, said second transfer case end being connected to said second power transfer case, said third and fourth axles being substantially co-linear.

10. The braking system of claim 9, further including a third continuously variable transmission and a third brakable wheel connected to said wheel end of said third axle, said third continuously variable transmission being operatively positioned between said third brakable wheel and said second power transfer case.

11. The braking system of claim 10, further including a fourth continuously variable transmission and a fourth brakable wheel connected to said wheel end of said fourth axle, said fourth continuously variable transmission being operatively positioned between said fourth brakable wheel and said second power transfer case.

12. A braking system for use in a wheeled vehicle, the braking system comprising:

a power source having an output end;

an operator-controlled power source accelerator;

a continuously variable transmission connected to said output end of said power source;

an axle assembly;

a brakeable wheel, said brakeable wheel being operatively associated with said axle assembly;

a velocity sensor operatively associated with said axle assembly, said velocity sensor being capable of sensing the velocity of said brakeable wheel;

a feedback control circuit operatively associated with said continuously variable transmission, said feedback control circuit having a predetermined value for maximum desired percent slip that corresponds to maximum possible braking force of said brakeable wheel in relation to a road surface slip generally being defined as $$\frac{V - \omega r}{V}$$

where V=the forward velocity of the wheeled vehicle and ω=the rotational speed of said brakeable wheel (radius/sec):

an operator-controlled brake operatively associated with said continuously variable transmission, said operator-controlled brake including means for slowing the wheeled vehicle at a rate that is a percentage of said predetermined value for maximum percent slip in response to the velocity of said brakeable wheel sensed by said velocity sensor; and means for transmitting braking force between said continuously variable transmission and said brakeable wheel.

13. The braking system of Claim 12, wherein said means for transmitting braking force comprises a drive shaft.

14. The braking system of claim 13, further including an axle, said drive shaft being connected to said axle and said brakable wheel comprising two brakable wheels, each wheel of said pair of brakable wheels being connected to said axle.

15. The braking system of claim 14, wherein said drive shaft is a first drive shaft and said axle is a first axle, said system further including a second drive shaft connected to said power source and a second axle having a pair of brakable wheels connected thereto, said second drive shaft being connected to said second axle.

16. The braking system of claim 13, wherein said continuously variable transmission is a first transmission, said drive shaft is a first drive shaft and said brakable wheel is a first wheel, said system further including a second continuously variable transmission connected to said power source, a second drive shaft connected to said second transmission, and a second brakable wheel connected to said second drive shaft.

17. The braking system of claim 12, wherein said power source is an internal combustion engine.

18. The braking system of claim 12, wherein said power source is an electric motor.

19. The braking system of Claim 12, further including a plurality of continuously variable transmissions connected to said power source and a plurality of brakable wheels, each of said brakable wheels being connected to each of said plurality of transmissions.

20. A method for braking a wheeled vehicle, the method comprising the steps of:

(a) forming a wheeled vehicle comprising:

a power source;

at least one axle assembly;

a velocity sensor operatively associated with said at least one axle assembly;

a plurality of wheels, said at least one of said plurality of wheels being a brakeable wheel operatively associated with said at least one axle assembly, said brakeable wheel having a movable position and a fixed position;

a continuously variable transmission connected to said power source for adjusting said brakeable wheel to a point between and including said movable position and said fixed position;

a feedback control circuit operatively associated with said continuously variable transmission;

an operator-manipulated braking control operatively associated with said continuously variable transmission;

means operatively associated with said continuously variable transmission for slowing the wheeled vehicle at a rate that is a percentage of a predetermined desired maximum percent slip;

(b) determining a value for maximum percent slip of said brakeable wheel in relation to a road surface, slip being defined generally as $$\frac{V - \omega r}{V}$$

where V=the formed velocity of the wheel vehicle and ω=the rotational speed of said brakeable wheel (radius/sec):

(c) providing said feedback control system with said value for maximum slip;

(d) manipulating said operator-manipulated braking control;

(e) sensing the velocity of said at least one brakeable wheel and providing a value representing said velocity to said feedback control system; and (f) slowing the wheeled vehicle at a rate that is a percentage of said predetermined maximum percent slip.

* * * * *